(12) United States Patent
Kwatra et al.

(10) Patent No.: US 11,222,198 B2
(45) Date of Patent: Jan. 11, 2022

(54) VIDEO ANALYSIS SYSTEM FOR OPTIMIZING AN ACTIVITY PROTOCOL

(71) Applicant: International Business Machines Corporation, Armonk, NY (US)

(72) Inventors: Shikhar Kwatra, Durham, NC (US); Saurabh Sanjay Nachane, Cary, NC (US); Jun Zhu, Cary, NC (US); Shilpi Bhattacharyya, Stoney Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 16/690,560

(22) Filed: Nov. 21, 2019

(65) Prior Publication Data

US 2021/0158027 A1 May 27, 2021

(51) Int. Cl.
| | | |
|---|---|---|
| *G06K 9/00* | (2006.01) | |
| *G06N 3/04* | (2006.01) | |
| *A01K 5/02* | (2006.01) | |
| *G06K 9/62* | (2006.01) | |

(Continued)

(52) U.S. Cl.
CPC ............ *G06K 9/00335* (2013.01); *A01K 5/02* (2013.01); *A01K 29/005* (2013.01); *G06K 9/00362* (2013.01); *G06K 9/6201* (2013.01); *G06K 9/6228* (2013.01); *G06N 3/04* (2013.01); *G06N 3/08* (2013.01)

(58) Field of Classification Search
CPC ........... G06K 9/00335; G06K 9/00362; G06K 9/6201; G06K 9/6228; A01K 5/02; A01K 29/005; G06N 3/04; G06N 3/08
See application file for complete search history.

(56) References Cited

U.S. PATENT DOCUMENTS

| | | | |
|---|---|---|---|
| 6,233,428 B1 | 5/2001 | Fryer | |
| 10,165,230 B2 | 12/2018 | Glazer | |
| 11,012,683 B1 * | 5/2021 | Beach | H04N 17/002 |

(Continued)

FOREIGN PATENT DOCUMENTS

| | | |
|---|---|---|
| CN | 106056035 A | 10/2016 |
| KR | 20160029042 A | 3/2016 |

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Utpal D Shah
(74) *Attorney, Agent, or Firm* — Law Office of Jim Boice

(57) ABSTRACT

A method implements an activity protocol that has been established for a living entity. The method directs an artificial intelligence system to compare a video of an activity by a living entity to an activity protocol that has been established for the living entity, and then receives an indication from the artificial intelligence system that the activity by the living entity does not match the activity protocol that has been established for the living entity. In response to receiving the indication from the artificial intelligence system that the activity by the living entity does not match the activity protocol that has been established for the living entity, the method directs a monitoring entity to implement the activity protocol that has been established for the living entity.

19 Claims, 9 Drawing Sheets

(51) Int. Cl.
  *G06N 3/08* (2006.01)
  *A01K 29/00* (2006.01)

(56) References Cited

U.S. PATENT DOCUMENTS

| | | | | |
|---|---|---|---|---|
| 2007/0100666 | A1 | 5/2007 | Stivoric et al. | |
| 2020/0013148 | A1* | 1/2020 | Jones | G06K 9/00771 |
| 2020/0113158 | A1* | 4/2020 | Rishi | A01K 61/10 |
| 2020/0125849 | A1* | 4/2020 | Labrecque | G06K 9/0063 |
| 2020/0260052 | A1* | 8/2020 | Hutchinson | A61B 5/113 |
| 2020/0337272 | A1* | 10/2020 | Kumar | G06K 9/00624 |
| 2021/0035437 | A1* | 2/2021 | Zhang | G08B 21/0476 |

OTHER PUBLICATIONS

Columbia University, "Intelligent Infant Monitoring System", EECS E4764 Fall'16 Internet of Things, Intelligent and Connected Systems, Team 4 Project Report.

Hagenbuchner et al., "Prediction of Activity Type in Preschool Children Using Machine Learning Techniques", Journal of Science and Medicine in Sport, vol. 18, No. 4, Jul. 2015, pp. 426-431.

Y. Kashimoto et al., "Sensing Activities and Locations of Senior Citizens Toward Automatic Daycare Report Generation," 2017 IEEE 31st International Conference On Advanced Information Networking and Applications (AINA), Taipei, 2017, pp. 174-181.

C. Ye et al., "ERAR: An Event-Driven Approach for Real-Time Activity Recognition," 2015 International Conference on Identification, Information, and Knowledge in the Internet of Things (IIKI), Beijing, 2015, pp. 288-293.

S. Suzuki et al., "Activity Recognition for Children Using Self-Organizing Map," 2012 IEEE Ro-Man: The 21st IEEE International Symposium on Robot and Human Interactive Communication, Paris, 2012, pp. 653-658.

S. Phon-Amnuaisuk et al., "Exploring the Applications of Faster R-CNN and Single-Shot Multi-Box Detection in a Smart Nursery Domain." (Submitted on Aug. 27, 2018) https://arxiv.org/abs/1808.08675.

T. Van Kasteren et al.., "An Activity Monitoring System for Elder Care Using Generative and Discriminative Models." Personal Ubiquitous Comput. 14, 6 (Sep. 2010), pp. 489-498.

* cited by examiner

VIDEO ANALYSIS SYSTEM FOR OPTIMIZING AN ACTIVITY PROTOCOL

BACKGROUND

The present disclosure relates to the field of image analysis systems, and specifically to image analysis systems that receive videos of activities of a living entity. Still more particularly, the present disclosure relates to image analysis systems that use artificial intelligence to optimize an activity protocol of the living entity.

SUMMARY

In one or more embodiments of the present invention, a method implements an activity protocol that has been established for a living entity. The method directs an artificial intelligence system to compare a video of an activity by a living entity to an activity protocol that has been established for the living entity, and then receives an indication from the artificial intelligence system that the activity by the living entity does not match the activity protocol that has been established for the living entity. In response to receiving the indication from the artificial intelligence system that the activity by the living entity does not match the activity protocol that has been established for the living entity, the method directs a monitoring entity to implement the activity protocol that has been established for the living entity.

In one or more embodiments, the method(s) described herein are performed by an execution of a computer program product.

DETAILED DESCRIPTION

Figure 1:
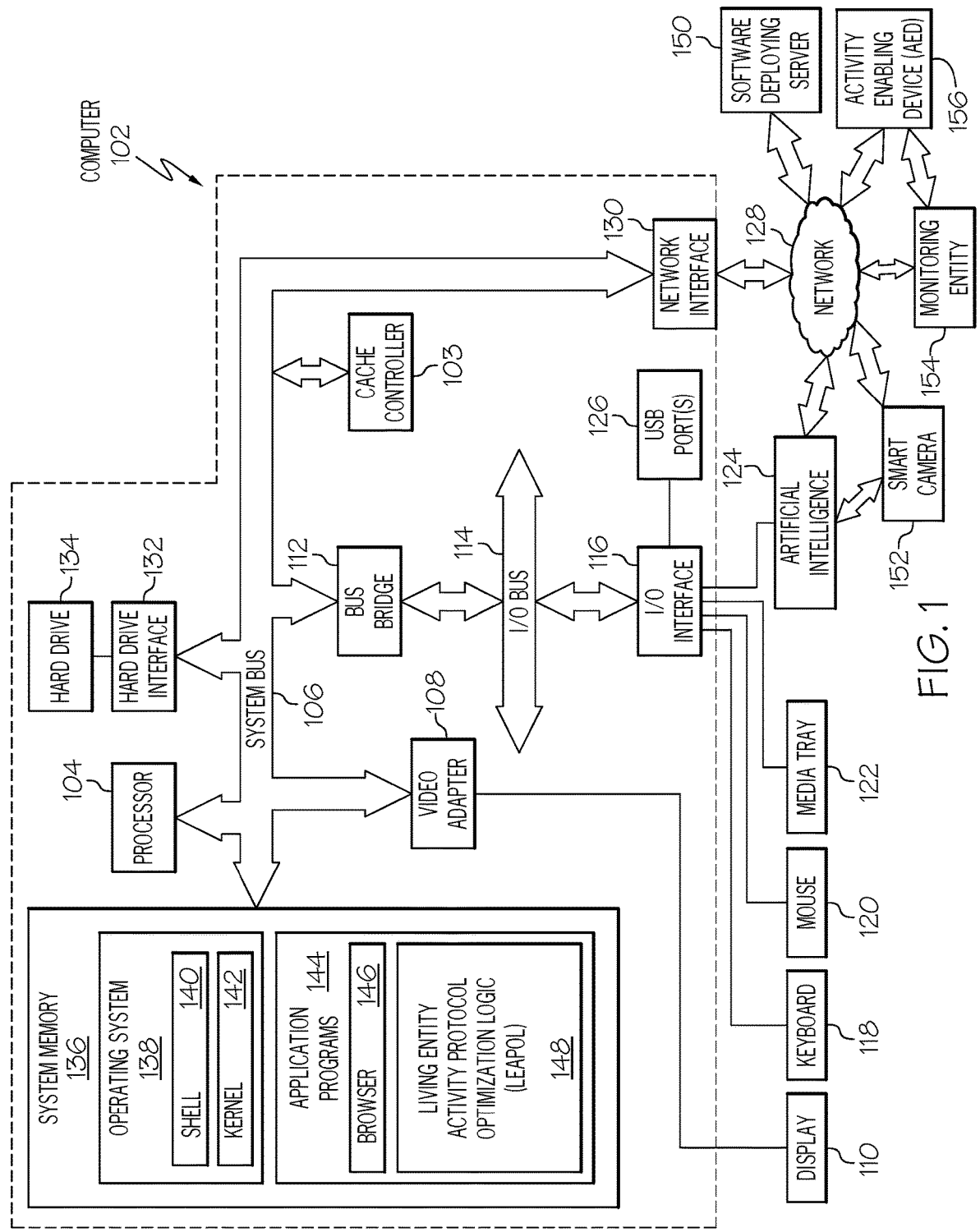
FIG. 1 depicts an exemplary system and network in which one or more embodiments of the present disclosure can be implemented.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that can be utilized by and/or in the implementation of one or more embodiments of the present invention. Note that some or all of the exemplary architecture, including both depicted hardware and software, shown for and within computer 102 can be utilized by software deploying server 150 and/or smart camera 152 and/or monitoring entity 154 and/or activity enabling device (AED) 156 shown in FIG. 1; computer 202 and/or smart camera 252 and/or monitoring entity 254 and/or activity enabling device (AED) 256 shown in FIG. 2; various components of smart camera 352 shown in FIG. 3; and/or one or more of the nodes/neurons shown in convolutional neural network (CNN) 401 depicted in FIG. 4-FIG. 6.

Exemplary computer 102 includes a processor 104 that is coupled to a system bus 106. Processor 104 can utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which can include storage devices such as CD-ROM drives, multi-media interfaces, etc.), an artificial intelligence 124, and external USB port(s) 126. While the format of the ports connected to I/O interface 116 can be any known to those skilled in the art of computer architecture, in one embodiment some or all of these ports are universal serial bus (USB) ports.

As depicted, computer 102 is able to communicate with artificial intelligence 124, a software deploying server 150, a smart camera 152, a monitoring entity 154, and/or an activity enabling device 156 by using a network interface 130 to a network 128. Network interface 130 is a hardware network interface, such as a network interface card (NIC), etc. Network 128 can be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Living Entity Activity Protocol Optimization Logic (LEAPOL) 148. LEAPOL 148 includes code for implementing the processes described below, including those described in FIGS. 2-7. In one embodiment, computer 102 is able to download LEAPOL 148 from software deploying server 150, including in an on-demand basis, wherein the code in LEAPOL 148 is not downloaded until needed for execution. Note further that, in one embodiment of the present invention, software deploying server 150 performs all of the functions associated with the present invention (including execution of LEAPOL 148), thus freeing computer 102 from having to use its own internal computing resources to execute LEAPOL 148.

Figure 4:
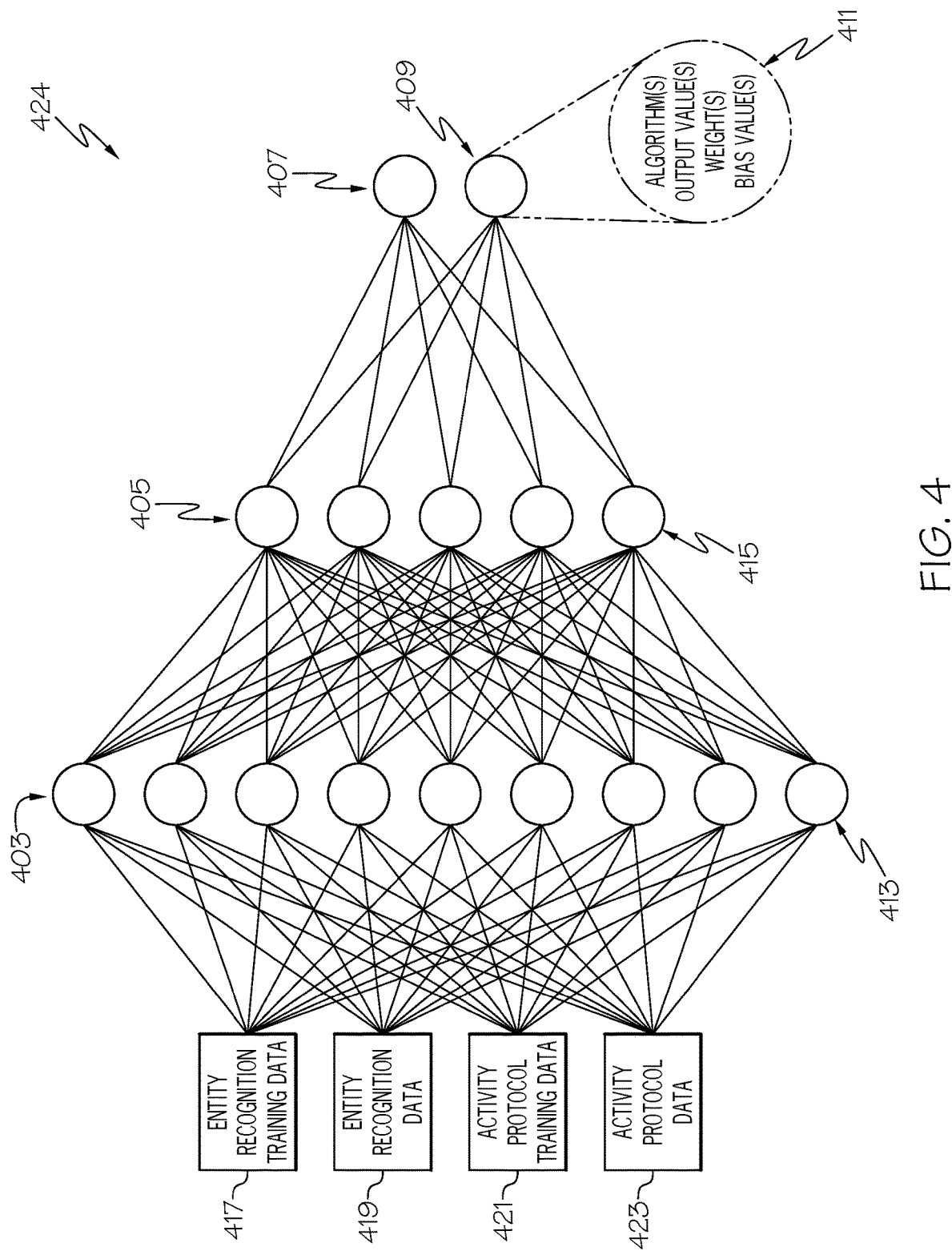
FIG. 4 illustrates an exemplary Convolutional Neural Network (CNN) as used in one or more embodiments of the present disclosure.
Figure 5:
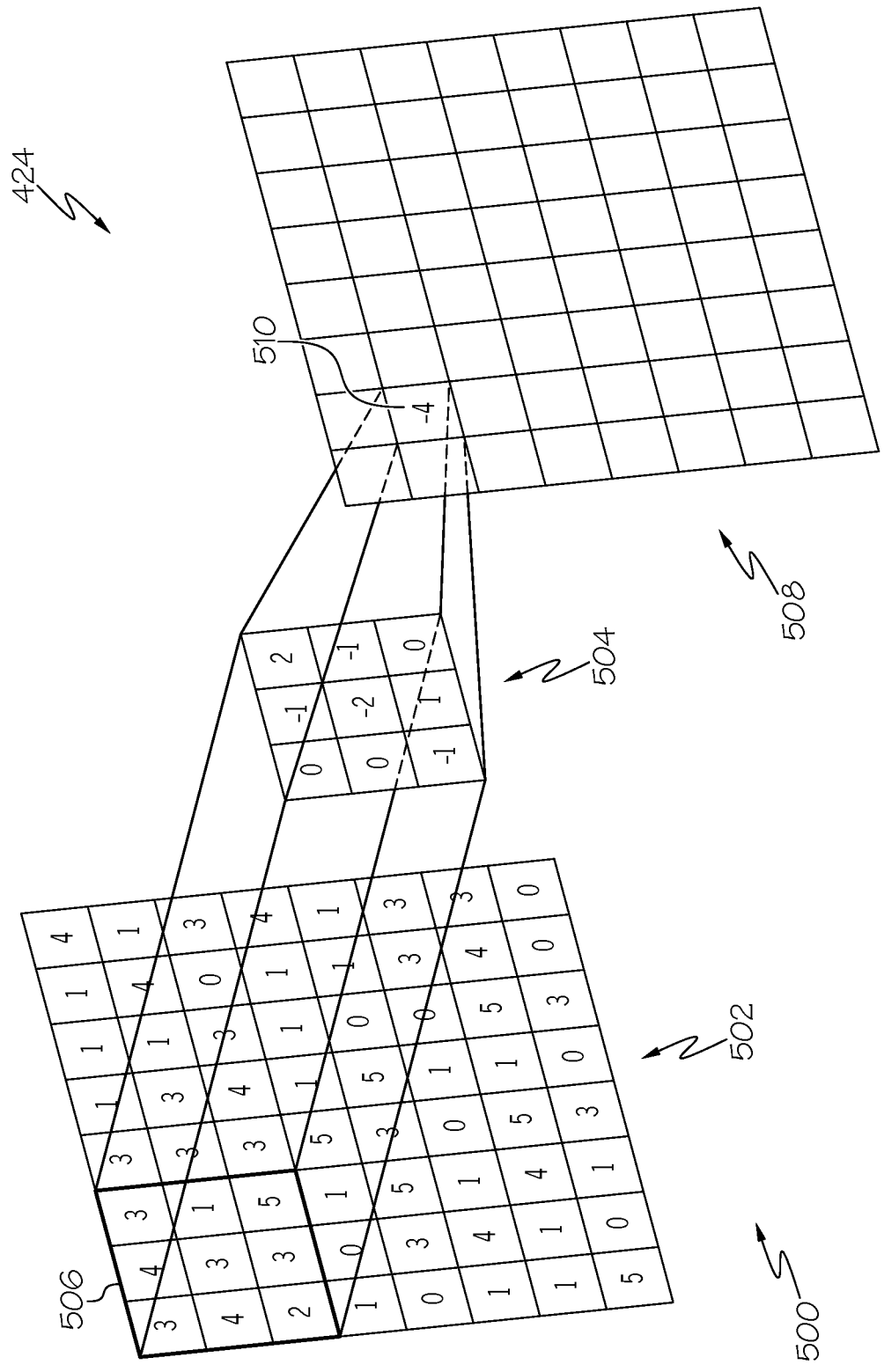
FIG. 5 depicts additional functionality detail of the CNN illustrated in FIG. 4.
Figure 6:
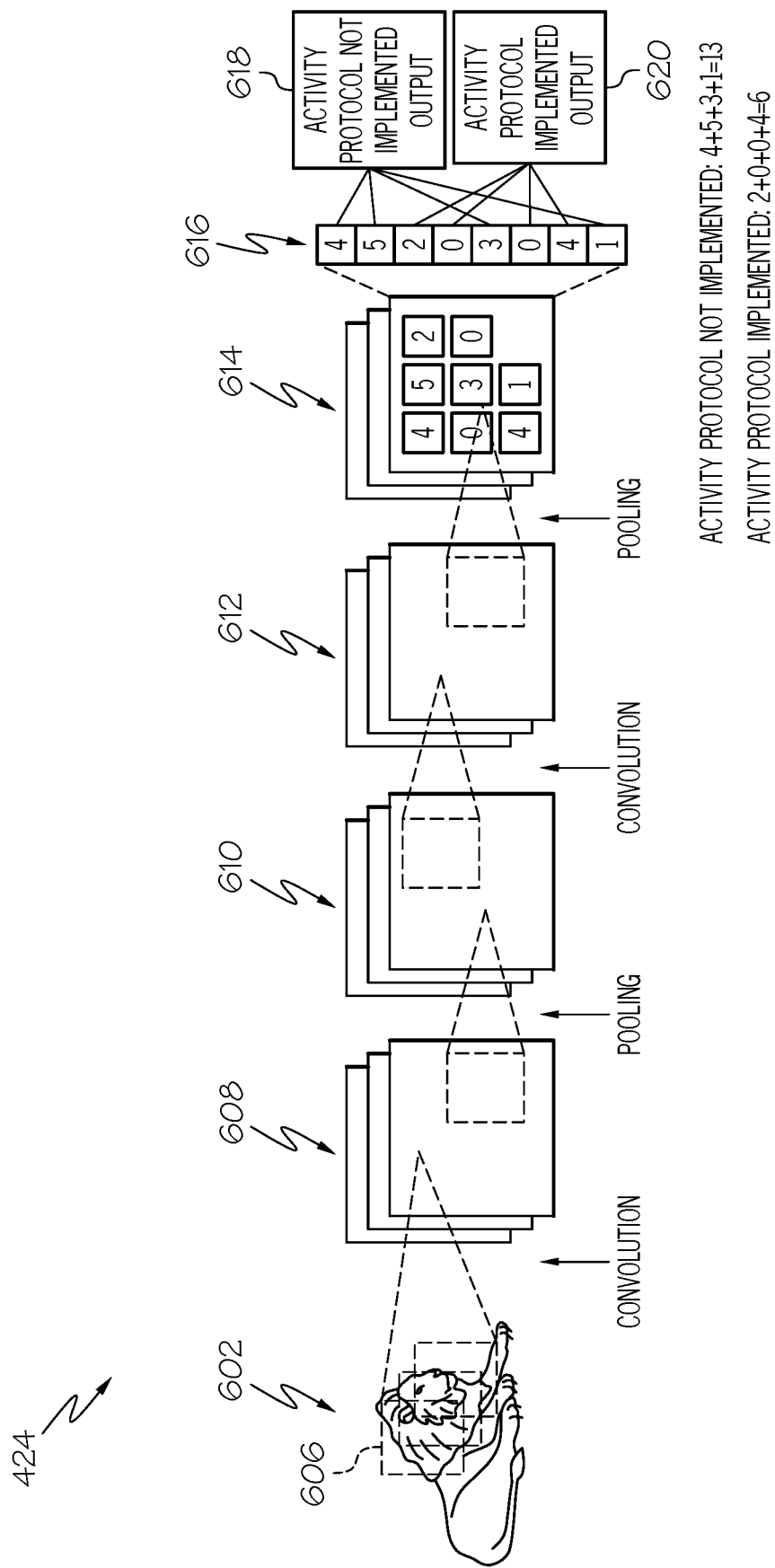
FIG. 6 illustrates an exemplary video being evaluated using the CNN depicted in FIG. 5 in accordance with one or more embodiments of the present invention.

Exemplary details of one or more embodiments of artificial intelligence 124 are depicted as convolutional neural network (CNN) 424 in FIG. 4, FIG. 5, and/or FIG. 6.

Figure 3:
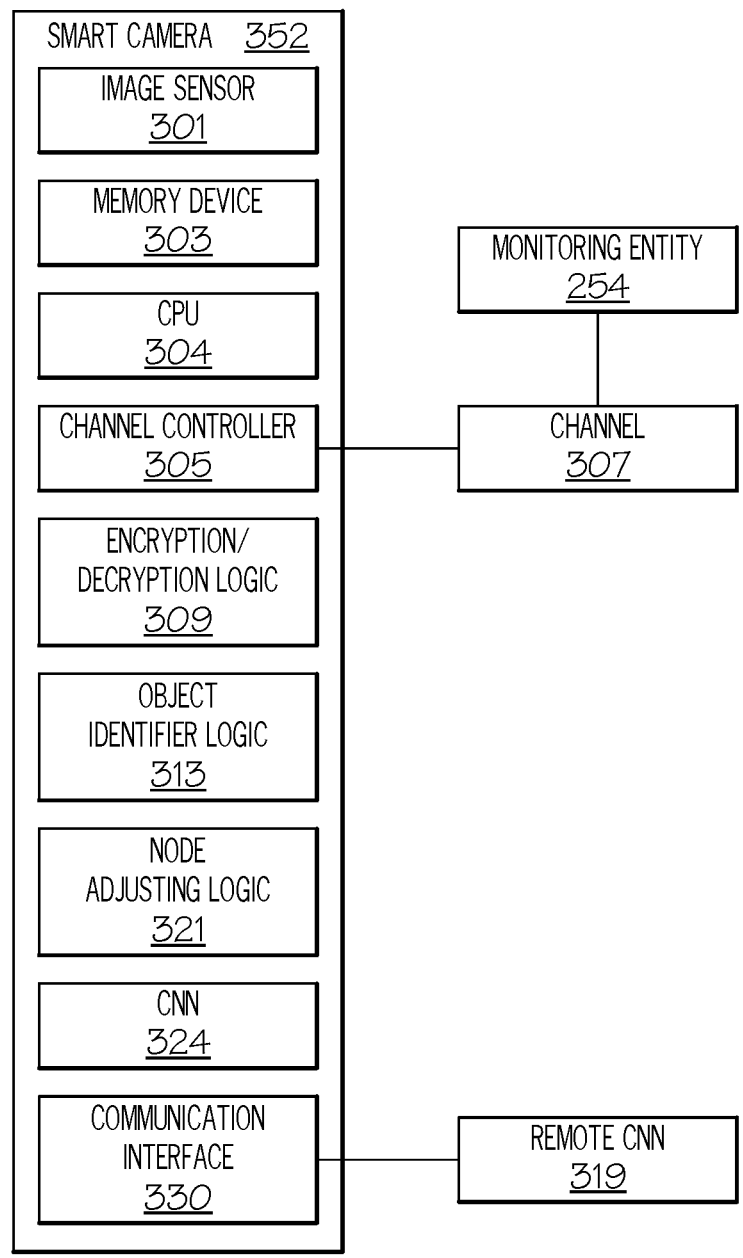
FIG. 3 depicts additional detail of a smart camera shown in FIG. 2 in accordance with one or more embodiments of the present invention.

Additional details of one or more embodiments of smart camera 152 are depicted in smart camera 352, which is shown in FIG. 3.

Figure 2:
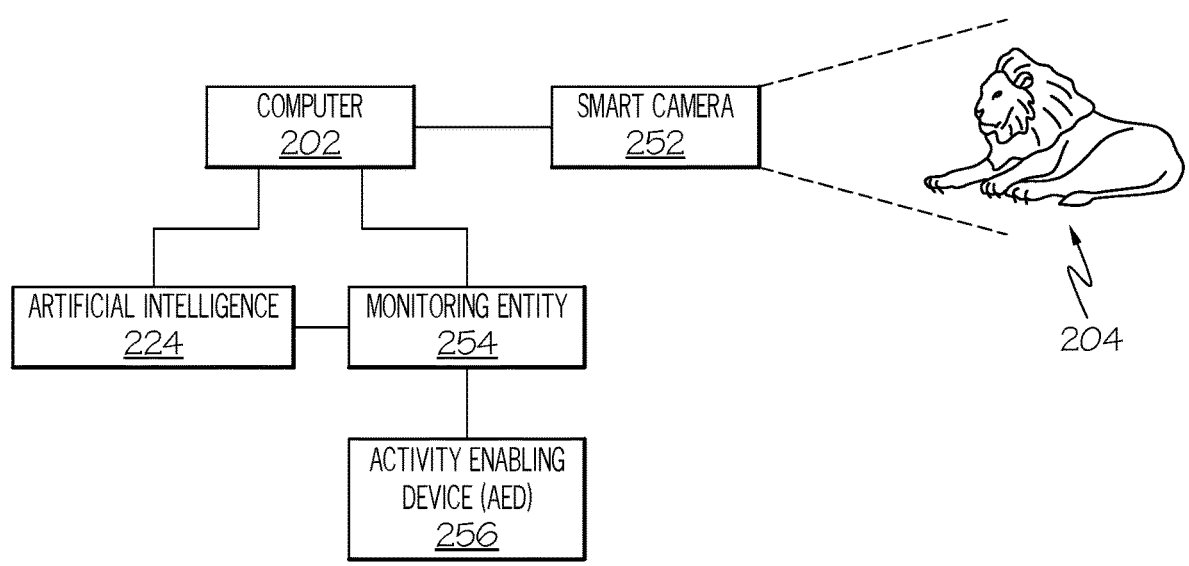
FIG. 2 illustrates an exemplary living entity being monitored for a particular activity protocol in accordance with one or more embodiments of the present invention.

In one or more embodiments of the present invention, monitoring entity 154 is a processing logic, sensing logic, and/or human that monitors a particular living entity. Additional details of one or more embodiments of monitoring entity 154 are described with reference to monitoring entity 254 as depicted in FIG. 2.

In one or more embodiments of the present invention, activity enabling device (AED) 156 is a physical device that enables the implementation of an activity protocol. Additional details of one or more embodiments of AED 156 are described with reference to AED 256 as depicted in FIG. 2.

In one or more embodiments of the present invention, a cache controller 103 monitors and controls cache (not depicted) used by the system memory 136.

Note that the hardware elements depicted in computer 102 are not intended to be exhaustive, but rather are representative to highlight essential components required by the present invention. For instance, computer 102 can include alternate memory storage devices such as magnetic cassettes, digital versatile disks (DVDs), Bernoulli cartridges, and the like. These and other variations are intended to be within the spirit and scope of the present invention.

As used herein, the term "living entity" is defined as a living organism, including but not limited to wildlife (i.e., untamed terrestrial, aquatic, and/or avian animals that live in the wild, on a game preserve, and/or in a zoo), domesticated animals (i.e., terrestrial, aquatic, and/or avian animals that have been domesticated for human use), and/or microorganisms (e.g., bacteria). As used herein, the term "living entity" excludes humans unless expressly included in a claim or description of one or more embodiments of the present invention in the specification.

As used herein, an "activity protocol" is defined as a designated set of actions/activities that have been predefined for promoting a state of the living entity. Examples of an activity protocol include, but are not limited to, feeding routines, travel movement, therapeutic medical regimens, exercise activities, etc.

As used herein, a "monitoring entity" is defined as a processing device, a mechanical device, and/or a human that monitors a living entity and/or implements an activity protocol for a living entity. Examples of a monitoring entity include, but are not limited to, a processing device such as a computer, a smart camera that captures images/videos of a living entity, a human, etc.

As used herein, an "activity enabling device" (AED) is defined as a physical device that enables the implementation of an activity protocol. Examples of an AED include, but are not limited to, a food dispenser for a living entity, a physical barrier and/or lure (e.g., bait food) that directs travel movement of a living entity, a medicine dispenser for a living entity, etc.

With reference now to FIG. 2, assume, for explanatory purposes, that a living entity 204 is wildlife (e.g., a lion), which is either living in the wild or in a zoo. Assume further that an activity protocol has been established for that lion to eat, move, etc. according to a certain protocol.

For example, assume that the lion is living in the wild, and that a wildlife biologist has determined that this particular lion should be eating a certain amount of food each week, should be restricted to moving about in a particular area (e.g., away from human populated areas), etc., as detailed in an activity protocol developed by the wildlife biologist for that particular lion (or alternatively, for any lion in the area that has the same physical features as that particular lion). As such, in one or more embodiments of the present invention, a monitoring entity 254 determines whether an activity protocol for that particular lion is being followed. If not, and in one or more embodiments of the present invention, the monitoring entity 254 activates an activity enabling device (AED) 256, which enables the activity protocol to be followed.

A smart camera 252 (analogous to smart camera 152 shown in FIG. 1) monitors the activities and movement of that particular lion (living entity 204). Details of one or more embodiments of smart camera 252 are shown in the smart camera 352 shown in FIG. 3.

With reference then to FIG. 3, exemplary smart camera 352 (analogous to smart camera 252 shown in FIG. 2) is used to capture photos and/or videos of living entities, such as the lion shown in FIG. 2. The following components, as found in one or more embodiments of the present invention, of smart camera 352 are shown in FIG. 3.

Image sensor 301 is an optic sensor (e.g., a Complementary Metal-Oxide-Semiconductor—CMOS) that converts light, which is focused by a lens (not shown), into an electronic signal describing an image. This electronic signal is converted in binary data, which is then sent to a memory device 303 (e.g., a memory card).

The object identifier logic 313 is logic used to identify a living entity and activities thereof within a photograph/video captured by the smart camera 352. In one or more embodiments of the present invention, an on-board convolutional neural network (CNN) 324 performs these actions. CNN 324 is analogous to the CNN 424, or an abbreviated version of the CNN logic 424 described in FIG. 4, FIG. 5, and/or FIG. 6.

In one or more embodiments of the present invention, if the camera 352 has sufficient processing power to run a full or the abbreviated version of the on-board CNN 324, then it will do so. However, if the camera 352 has insufficient processing power to run the full version of the CNN 324, then a limited version (e.g., in which only one convolution/pooling operation is performed, in which only a limited number of prediction outputs is supported, etc.) is performed. In either scenario, running the CNN 324 reduces the amount network bandwidth taken up by smart camera 352 if it were to be communicating with a remote CNN 319.

In one or more embodiments of the present invention, if camera 352 has insufficient processing power to run the on-board CNN 324, then a communication interface 330 will connect the camera 352 to a remote CNN 319, which runs on a remote server/computer (not shown).

Node adjusting logic 321 is logic that adjusts weights and/or algorithms and/or bias values in the CNN 324 using regressive analysis. That is, node adjusting logic 321 is a processor that has been preconfigured to determine the accuracy of the predicted outputs (as shown in the example of FIG. 6), and then adjust the weight and/or algorithm in the neurons in the CNN (see FIG. 3) until the prediction outputs accurately describe the photographed object. This process of node adjusting is preferably performed by back propagation, which reiteratively adjusts the weights/algorithm and/or bias (an offset value that adjusts the total activation level of the neuron). In another embodiment, the node adjusting logic 321 is executed software, in which the node adjusting is performed using software that directly adjusts the neurons' weights/algorithms/biases.

In one or more embodiments of the present invention, the functions performed by one or more of object identifier logic 313 and node adjusting logic 321 are performed by an on-board Central Processing Unit (CPU) 304 (analogous to processor 104 shown in FIG. 1) executing some or all of the instructions found in LEAPOL 148 shown in FIG. 1.

In one or more embodiments of the present invention, smart camera 352 includes a channel controller 305, which determines whether images captured by the smart camera 352 are permitted to be transmitted to a channel 307, which is in communication with the monitoring entity 254 shown in FIG. 2 and FIG. 3. This channel controller 305 permits only images of a particular living entity to be transmitted to that particular monitoring entity 254 if the channel controller has been provided appropriate credentials from the monitoring entity 254. Examples of such credentials include, but are not limited to, private/public keys used for encryption/decryption of images by the encryption/decryption logic 309 in the smart camera 352 and in the monitoring entity 254 (assuming that monitoring entity 254 has an encryption/decryption logic, not shown but similar to encryption/decryption logic 309), confirmed identification of authorized users of the monitoring entity 254, etc.

Returning to FIG. 2, assume that smart camera 252 has captured video of the lion (i.e., living entity 204) that shows that this particular lion is not eating enough prey and/or is traveling into restricted areas (e.g., human populated areas). A determination of this lack of feeding and/or improper travel is ascertained by computer 202 (analogous to computer 102 shown in FIG. 1) and/or artificial intelligence 224 (analogous to artificial intelligence 124 shown in FIG. 1) and/or monitoring entity 254 (analogous to monitoring entity 154 shown in FIG. 1).

In one or more embodiments of the present invention, a Convolutional Neural Network (CNN) is utilized as artificial intelligence 224 to 1) analyze the images, data, photograph(s), etc. in order to identify a particular (or particular type of) living entity; and 2) determine whether that living entity is behaving in a manner that conforms with the activity protocol that has been developed for that living entity.

As the name implies, a CNN utilizes logic similar to that of a Deep Neural Network (DNN), but with several significant differences. Before discussing these differences, a description of neurons used in any type of neural network is now presented.

A neural network, as the name implies, is roughly modeled after a biological neural network (e.g., a human brain). A biological neural network is made up of a series of interconnected neurons, which affect one another. For example, in a biological neural network, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected other biological neurons.

An electronic neural network similarly is made up of electronic neurons.

In a DNN, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

In one or more embodiments of the present invention, each neuron in an electronic neural network is a separate processing device.

In one or more embodiments of the present invention, each neuron in an electronic neural network is software running on one or more processors.

In one or more embodiments of the present invention, the neurons in an electronic neural network is a combination of hardware processors and software logic.

A CNN is similar to a DNN in that both utilize interconnected electronic neurons. However, a CNN is different from a DNN in that 1) a CNN has neural layers whose sizes are based on filter sizes, stride values, padding values, etc. (see FIGS. 5) and 2) a CNN utilizes a convolution scheme to analyze image data (see FIG. 6). A CNN gets its "convolutional" name based on a convolution (i.e., a mathematical operation on two functions to obtain a result) of filtering and pooling pixel data (a mathematical operation on two functions) in order to generate a predicted output (obtain a result).

With reference now to FIG. 4, an exemplary set of components of a CNN 424 as used in one or more embodiments of the present invention is presented. Each depicted node in FIG. 4 represents a neuron (i.e., an electronic neuron). In accordance with one or more embodiments of the present invention, an input layer 403 includes neurons that receive data that describes pixels from a photograph/video. Rather than being connected to an equal number of neurons (as in a DNN), the neurons from the input layer 403 of the CNN 424 connect to a fewer number of neurons in a middle layer 405, which connect to an even fewer number of neurons in the output layer 407. However, it is not necessarily always the case that the number of neurons in subsequent layers in the CNN 424 are decreased. For example, CNN 424 can have a middle layer 405 that is the same size as the input layer 403, or can have a middle layer 405 that is larger than the size of the input layer 403, depending on how the CNN 424 is designed. More specifically, for a given convolutional layer and/or pooling layer, the filter size, the stride value, and the padding (e.g., weight) value of the neuron(s) determine the size of the next layer.

As just mentioned, each node in the depicted CNN 424 represents an electronic neuron, such as the depicted neuron 409. As shown in block 411, in one or more embodiments, each neuron (including neuron 409) within the CNN 424 functionally includes one or more of four features: an algorithm, an output value, a weight, and a bias value.

The algorithm is a mathematic formula for processing data from one or more upstream neurons. For example, assume that one or more of the neurons depicted in the middle layer 405 send data values to neuron 409. Neuron 409 then processes these data values by executing the algorithm shown in block 411, in order to create one or more output values, which are then sent to another (not shown) neuron or another device. Each neuron also has a weight, that is specific for that neuron and/or for other connected neurons. Furthermore, the output value(s) are added to bias value(s), which increase or decrease the output value, allowing the DNN 424 to be further "fine-tuned".

For example, assume that neuron 413 is sending the results of its analysis of a piece of data to neuron 415. Neuron 415 has a first weight and/or bias value that defines how important data coming specifically from neuron 415 is. If the data is important, then data coming from neuron 413 is weighted heavily, thus causing the algorithm(s) within neuron 415 to generate a higher output, which will have a heavier impact on neurons in the output layer 407. Similarly, if neuron 415 has been determined to be significant to the operations of neuron 409, then the weight and/or bias value in neuron 415 will be increased, such that neuron 409 receives a higher value for the output of the algorithm in the neuron 415. These weights/bias values are adjustable for one, more, or all of the neurons in the CNN 424, such that a reliable output will result from output layer 407. Such adjustments can be performed manually or automatically.

When manually adjusted, the weights are adjusted by the user, sensor logic, etc. in a repeated manner until the output from output layer 407 matches expectations. For example, assume that input layer 403 receives pixel values (color, intensity, shading, etc.) from pixels and changes to such pixels between frames in a video of a lion. If the output from output layer 407 is a vector that is predetermined to describe the lion not performing a certain activity protocol (e.g., (1,2,4,10)), then the weights and/or biases and/or algorithms are adjusted until the vector (1,2,4,10), or a vector that is mathematically similar, is output from output layer 407 when pixel data from a video of a living organism that is not conforming with its activity protocol is input into input layer 403.

When automatically adjusted, the weights (and/or algorithms) are adjusted using "back propagation", in which weight values of the neurons are adjusted by using a "gradient descent" method that determines which direction each weight value should be adjusted to. This gradient descent process moves the weight in each neuron in a certain direction until the output from output layer 407 improves (e.g., gets closer to (1,2,4,10)).

Thus, as shown in FIG. 4, assume that CNN 424 is being trained to recognize a particular living entity (e.g., a particular lion or a lion that has certain predefined characteristics, appearance, routines, etc.). As such, entity recognition training data 417 contains images of different animals (lions, tigers, bears), whose characteristics are compared by the neurons in CNN 424 to entity recognition data 419, which includes image data known to represent certain animals. This results in values in the output layer 407 which represent these different animals.

In addition, and in one or more embodiments of the present invention, CNN 424 is also trained to recognize a particular activity protocol (e.g., required eating, movement, etc. by the living entity). As such, activity protocol training data 421 contains data that descried certain activities (e.g., certain feeding schedules, movement, etc.), which is compared by the neurons in CNN 424 to activity protocol data 423, which includes known activity protocol data for various animals. This results in values in the output layer 407 which represent how closely various sets of data from the activity protocol training data 421 matches the activity protocol data 423.

Thus, the training of the neurons of CNN 424 shown in FIG. 4, combined with training of a convolution stage of CNN 424 (as discussed below and depicted in FIG. 5), followed by a training of a pooling stage and a classification stage of CNN 424 (as discussed below and depicted in FIG. 6), trains the CNN 424 to 1) recognize a particular living entity from a video, and 2) determine whether that particular living entity is in conformance with a particular activity protocol.

With reference now to FIG. 5 and FIG. 6, a CNN process includes 1) the convolution stage (depicted in FIG. 5), followed by a 2) pooling stage and a classification stage (depicted in FIG. 6).

As shown in FIG. 5, a convolution scheme to analyze image data is depicted as CNN convolution process 500. As shown in FIG. 5, pixel data from each of a series of photographs (i.e., frames from a video) populates an input table 502. Each cell in the input table 502 represents a value of a pixel in each photograph. This value is based on the color and intensity for each pixel. A subset of pixels from the input table 502 is associated with a filter 504. That is, filter 504 is matched to a same-sized subset of pixels (e.g., pixel subset 506) by sliding the filter 504 across the input table 502. The filter 504 slides across the input grid at some predefined stride (i.e., one or more pixels). Thus, if the stride is "1", then the filter 504 slides over in increments of one (column) of pixels. In the example shown in FIG. 5, this results in the filter 504 sliding over the subset of pixels shown as pixel subset 506 (3,4,3,4,3,1,2,3,5 when read from left to right for each row) followed by filter 504 sliding over the subset of pixels just to the right (4,3,3,3,1,3,2,5,3). If the stride were "2", then the next subset of pixels that filter 504 would slide to would be (3,3,1,1,3,3,5,3,4).

Filter 504 is applied against each pixel subset using a mathematical formula. That is, the values in the filter 504 are added to, subtracted from, multiplied by, divided by, or otherwise used in a mathematical operation and/or algorithm with the values in each subset of pixels. For example, assume that the values in filter 504 are multiplied against the pixel values shown in pixel subset 506 ((3×0)+(4x−1)+(3×2)+(4×0)+(3x−2)+(1x−1)+(2x−1)+(3×1)+(5×0)) to arrive at the value of −4. This value is then used to populate feature map 508 with the value of −4 in cell 510.

In one or more embodiments, the convolution step also includes use of an activation function, which transforms the output of the convolution operation into another value. One purpose of the use of an activation function is to create nonlinearity in the CNN. A choice of specific activation function depends on an embodiment. Popular choices of an activation function include a rectified linear unit (ReLU), a leaky ReLU, a sigmoid function, a tanh function, and so on.

In one or more embodiments of the present invention, each subset of pixels uses a same filter. However, in a preferred embodiment, the filter used by each subset of pixels is different, thus allowing a finer level of granularity in creating the feature map.

With reference now to FIG. 6, the pooling stage and a classification stage (as well as the convolution stage) of a CNN 424 during inference processing is depicted. That is, once the CNN 424 is optimized by adjusting weights and/or algorithms in the neurons (see FIG. 4), by adjusting the stride of movement of the pixel subset 506 (see FIG. 5), and/or by adjusting the filter 504 shown in FIG. 5, then it is trusted to be able to recognize similar living entities in similar videos, as well as similar entity activities in similar videos. This optimized CNN is then used to infer (hence the name inference processing) that the living entity in a new video is the same living entity that the CNN has been trained to recognize, and to infer that the activity being performed by the living entity in the new video is the same activity that CNN 424 has been trained to recognize. Similarly, if the living entity is not performing the entity activity, CNN 424 has been trained to recognize this as well. In either embodiment, CNN 424 recognizes whether the living entity 204 is conforming with the entity activity based on movements of the living entity 204.

In order to determine movement of the living entity 204 shown in FIG. 2, the process shown in FIG. 5 is repeated for each frame from the video, in order to detect changes in the figures/pixel, thereby detecting the movement/activities of the living entity 204. These changes are then used in a convolution/pooling process depicted in FIG. 6.

As shown in FIG. 6, assume that pixels from multiple frames of a video are used as inputs to the input table 502 shown in FIG. 5, using a CNN that has been previously defined and optimized to recognize the image of a particular living object and movement thereof. The pixels from these multiple frames of the video make up input tables 602. Assume further that a series of pixel subsets, including each pixel subset 606 (analogous to pixel subset 506 shown in FIG. 5) from the different video frames are convolved (using the process described in FIG. 5), and are applied to each of the input tables 602, thus resulting in a set of feature maps 608 (analogous to feature map 508 shown in FIG. 5). Once the feature maps 608 are generated, they are pooled into smaller pooled tables 610, in order to reduce the dimensionality of the values, thereby reducing the number of parameters and computations required in the CNN process. Once these pooled tables 610 are created, they themselves are then convoluted to create new (and even more compressed) feature maps 612, which are then pooled to create even more compressed pooled tables 614. This pooling and convolution is performed on each frame from the video.

The pooled tables 614 (which in one or more embodiments of the present invention is actually a single table) for all of the frames from the video are "unrolled" to form a linear vector, shown in FIG. 6 as a fully connected layer 616. Fully connected layer 616 is connected to an activity protocol compliance output, including activity protocol not implemented output 618 and activity protocol implemented output 620.

That is, the changes in the frames/pixels in the different frames from the video show a certain movement/activity of the living entity whose movements are being captured by the smart camera 252 shown in FIG. 2. CNN 424 has been trained (by adjusting the elements shown in block 411 in FIG. 4) to recognize certain patterns of movement of that particular living entity (or alternatively, another living entity that has the same physical characteristics of that particular living entity) as conforming or else not conforming with an activity protocol for that particular living entity.

In one or more embodiments of the present invention, for a determination by CNN 424 that a particular activity protocol has not been implemented to be considered accurate, CNN 424 must output a predefined total value (e.g., 10 or greater) for the sum of values from cells in the fully connected layer 616 to which it is connected. As such, the activity protocol not implemented output 618 is connected to cells in the fully connected layer 616 that have the values of 4, 5, 3, and 1, resulting in a sum total of 13. Thus, the CNN 424 concludes that the set of images from a video of the living organism shown in the input tables 602 indicates that the living organism is not in compliance with the activity protocol. In one or more embodiments of the present invention, an output function, such as a softmax function, amplifies larger output values, attenuates smaller output values, and normalizes all output values in order to ensure that their total sum is one. That is, rather than assigning an arbitrary number (e.g., 10) as being what the sum total of values in certain cells from the fully connected layer 616 must exceed in order to indicate that a particular living entity (e.g., a lion) is not conforming with the activity protocol, an output function such as a softmax function dynamically adjusts the output values and then normalizes them, such that they sum up to 1.0 or some other predetermined number. Thus, while the described values shown in FIG. 6 describe the concept of output values describing conformance with a particular activity protocol, in practice a static threshold value is not used in certain embodiments. Rather, in this alternative/preferred embodiment, the system utilizes a normalized summation (as just described), in order to further control the output characteristics.

Once the value of the activity protocol not implemented output 618 is established and determined to have a highest value of other outputs, this result is presented to the monitoring entity 254 and/or AED 256 shown in FIG. 2 for their consideration. That is, the monitoring entity 254 and/or AED 256 are alerted that the monitored living entity 204 is not conforming to the activity protocol. For example, and in one or more embodiments, assume that the activity protocol is for that particular living entity to eat at least once a week. If the activity protocol not implemented output 618 from the CNN 424 indicates that this particular living entity has not eaten within the past week, then the monitoring entity 254 and/or AED 256 shown in FIG. 2 will respond with an appropriate action (e.g., directing the lion towards game, prepared food, etc.).

As depicted in FIG. 6, the activity protocol implemented output 620 is only 6 (2+0+0+4) based on the cells in the fully connected layer 616 to which it is attached. However, since this output is lower than the output represented in the activity protocol not implemented output 618, it is deemed to be less likely as being accurate, although it is still presented to the monitoring entity 254 and/or AED 256 shown in FIG. 2 for their consideration.

While the CNN 424 depicted in FIG. 6 has convolutional layers and pooling layers, some variants of CNN have other types of layers like deconvolution layers and upsampling layers. Those generally increase the size of the following layer.

Thus, the training of the neurons of CNN 424 shown in FIG. 4, combined with training of a convolution stage of CNN 424 (depicted in FIG. 5), followed by a training of a pooling stage and a classification stage of CNN 424 (depicted in FIG. 6), trains the CNN 424 to 1) recognize a particular living entity from a video, and 2) determine whether that particular living entity is in conformance with a particular activity protocol. This recognition/determination is then forwarded to the monitoring entity 254 and/or AED 256 in order to cause the activity protocol to be implemented.

Figure 7:
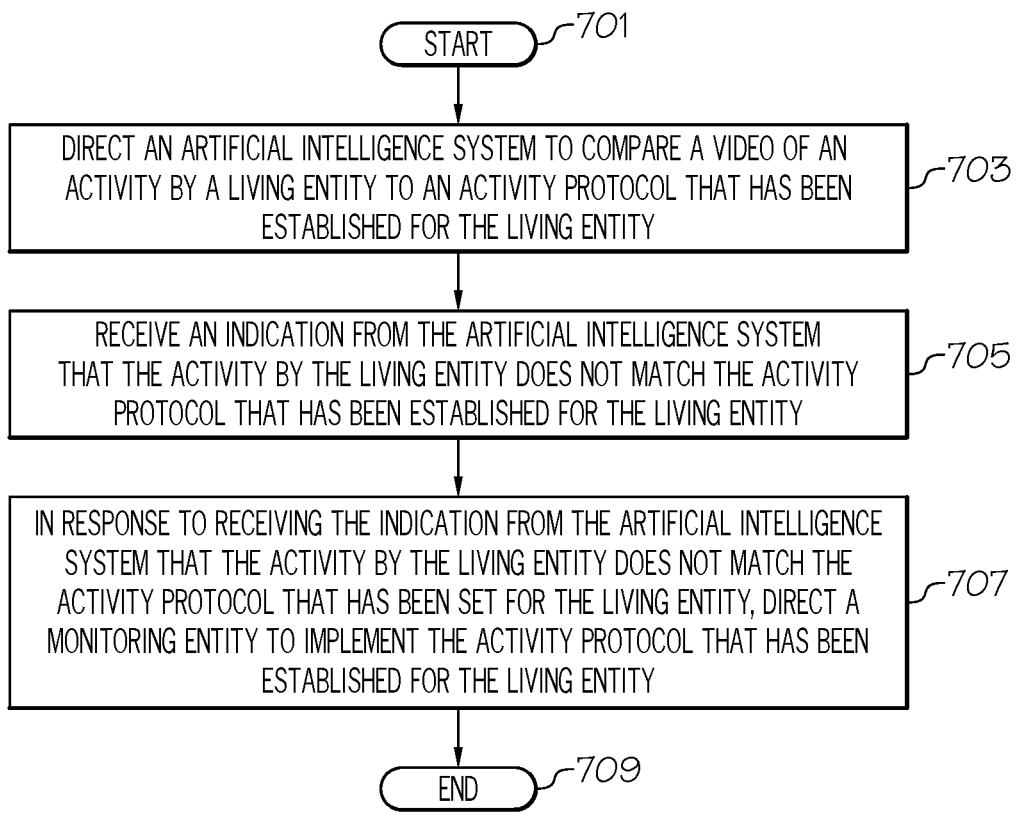
FIG. 7 is a high-level flow chart of one or more steps performed in accordance with one or more embodiments of the present invention.

With reference now to FIG. 7, a high-level flow chart of one or more steps performed in one or more embodiments of the present invention is presented.

After initiator block 701, one or more processors (e.g., processor 104 in computer 102 shown in FIG. 1) directs an artificial intelligence system (e.g., artificial intelligence 124 shown in FIG. 1) to compare a video of an activity by a living entity (e.g., living entity 204 shown in FIG. 2) to an activity protocol that has been established for the living entity, as described in block 703.

As described in block 705, the processor(s) receive an indication from the artificial intelligence system that the activity by the living entity does not match the activity protocol that has been established for the living entity, as described in FIG. 6 for one or more embodiments of the present invention;

As described in block 707, the processor(s), in response to receiving the indication from the artificial intelligence system that the activity by the living entity does not match the activity protocol that has been established for the living entity, direct a monitoring entity (e.g., monitoring entity 254 shown in FIG. 2) to implement the activity protocol that has been established for the living entity.

The flow chart ends at terminator block 709.

In one or more embodiments of the present invention, the living entity is wildlife, and the activity protocol is a pattern of feeding by the wildlife. For example, if the living entity is a wild lion, then the activity protocol could require that lion to eat at least once a week.

In one or more embodiments of the present invention, the living entity is wildlife, and the activity protocol is a pattern of travel by the wildlife. For example, if the living entity is a wild lion, then the activity protocol could be for that lion to travel only in certain areas.

In one or more embodiments of the present invention, the living entity is a domesticated animal, and the activity protocol is a pattern of feeding by the domesticated animal. For example, if the living entity is a domesticated animal such as a cow (livestock), a dog (a pet), etc., then the activity protocol for that domesticated animal could be for it to eat once a day.

In one or more embodiments of the present invention, the method further includes activating an activity enabling device in order to implement the activity protocol that has been established for the living entity. That is, the activity enabling device is a physical device that, when activated, enables the activity protocol to be implemented. For example, the activity enabling device could be an electronically activated mechanism that dispenses food to the living entity, an electronically controlled gate for controlling movement of the living entity, etc.

In one or more embodiments of the present invention, the artificial intelligence system is a convolutional neural network (CNN), and the method further includes: directing the CNN to extract an image of the living entity from an image of an environment of the living entity; and directing the CNN to use the extracted image of the living entity when comparing the video of the activity by the living entity to the activity protocol that has been established for the living entity.

That is, as shown in FIG. 4-FIG. 6, a CNN is trained to recognize a particular living entity. However, in order to be able to do this task, it is also trained to "ignore" foreground and background images, and to extract only the image of the living entity. As such, the CNN 424 uses entity recognition training data 417 and entity recognition data 419 that includes such foreground and background images, in order to train the CNN 424 to ignore images of anything other than the living entity.

In one or more embodiments in which the artificial intelligence system is a CNN, the video (i.e., the pixels that make up the input table 602 shown in FIG. 6) is a stack of video images taken at predetermined intervals that are greater than an image capture rate of a video camera, and the method further includes directing that the stack of video images be utilized as inputs to the CNN in order to identify the activity by the living entity. That is, rather than use every frame from a video, non-contiguous frames (e.g., every $100^{th}$ frame from the video) is analyzed by the CNN 424. Thus, changes in movement, feeding, etc. are still recognizable, while conserving processing resources, since every frame from the video is not being analyzed by the CNN 424. Rather, only some of the frames from the video are analyzed by the CNN 424.

In one or more embodiments of the present invention, the video is part of a plurality of videos of activities by the living entity, in which each of the plurality of videos are taken on different dates. In one or more of these embodiment(s), the method further includes: transmitting the plurality of videos to the monitoring entity, where each of the plurality of videos is transmitted to the monitoring entity on the different dates; receiving, from the monitoring entity, responses to the plurality of videos that were transmitted to the monitoring entity on the different dates; utilized received responses to the plurality of videos to determine a relevance of each of the videos to the activity protocol; and directing the artificial intelligence system to utilize videos having a relevance level that is greater than a predefined value as inputs for determining that the activity by the living entity does not match the activity protocol that has been established for the living entity.

That is, the monitoring entity 254 evaluates each video taken on different dates, and then responds with a relevance response saying, "this video shows nothing related to the activity protocol" (e.g., if the activity protocol was about feeding activities by the living entity, and the video only showed the living entity sleeping). Thus, such as video is ranked as being irrelevant to the process of evaluating whether the living entity is comporting with the activity protocol. However, a video showing the living entity either eating or not eating while awake is reported by the monitoring entity 254 to have a high relevance level, and thus is used as an input to the CNN 424 for determining whether the living entity is comporting with the activity protocol. In one or more embodiments of the present invention, the CNN 424 is further trained (using training data and baseline data, not shown, but analogous to the activity protocol training data 421 and the activity protocol data 423 shown in FIG. 4) to recognize which videos are relevant, and to what degree/level, for determining (by CNN 424) whether the living entity is comporting with the activity protocol.

In one or more embodiments of the present invention, the living entity is wildlife, and the method further comprises: retrieving an activity calendar for the wildlife; correlating the video of the activity by the living entity with an entry on the activity calendar for the wildlife; and identifying the wildlife based on a correlation of the video of the activity by the living entity with the entry on the activity calendar for the wildlife. For example, if a lion (wildlife) is known to travel to a certain territory during mating season (shown on a calendar for that lion), then the method will presume that a video of an animal in that certain territory is for the lion (either a particular lion, or any lion in the area).

While the living entity is described above as a terrestrial animal (e.g., a lion), in one or more embodiments of the present invention of the present invention, the living entity is an aquatic animal (e.g., a fish). As such, the smart camera 252 shown in FIG. 2 is able to monitor feeding habits, movement, etc. of such aquatic animals. If the activity protocol is not being followed by such aquatic animals, then the monitoring entity 254 will activate the AED 256 to release food pellets (e.g., if a fish is not catching enough wild food), open or close certain waterway gates (e.g., to control the movement of a fish when swimming upstream to spawn), etc.

In one or more embodiments of the present invention, the living entity is a microorganism (e.g., bacterium). For example, assume that the smart camera 252 has the ability to capture, dye (if necessary), and photograph bacteria within a water sample that has been captured by the smart camera 252 (using a pump, dye dispenser, etc., not shown in the figures). Assume further that the maximum concentration of this type of bacteria (e.g., *E-coli*) that is allowed to live in a certain body of water (e.g., a pond) in order to meet health standards (i.e., the activity protocol) is 88 *E-coli* bacteria per 100 milliliters of water. If the smart camera 252 photographs more than this level of bacteria in the water, then the AED 256 adds water to the pond, releases an anti-bacterial solution, etc. until the bacteria level is below the allowable concentration.

While the present invention is described above as optimizing activity protocols (i.e., by enabling their implementation) for non-human living entities, one or more embodiments of the present invention is implemented to assist human living entities.

For example, assume that the human living entity is person who is a medical patient, a person with limited capacities, etc., and that the activity protocol is for that person is that he/she eats at certain times, sleeps a certain number of hours per night, etc. In such embodiment(s), the monitoring entity 254 is a remote device used by a caretaker to monitor outputs of the smart camera 252 shown in FIG. 2. However, in order to permit the monitoring entity 254 to view such videos, security devices and protocols must first be implemented. That is, in order to monitor human entities, strict security protocol procedures must be complied with. Otherwise, and as described in FIG. 3, no videos of the human entities are ever able to be transmitted from the smart camera 352 shown in FIG. 3, since the channel controller 305 described above will block such transmissions. Similarly, no record of such videos is ever permanently saved in the memory device 303 of the smart camera 352 is these strict security protocol procedures are not complied with.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
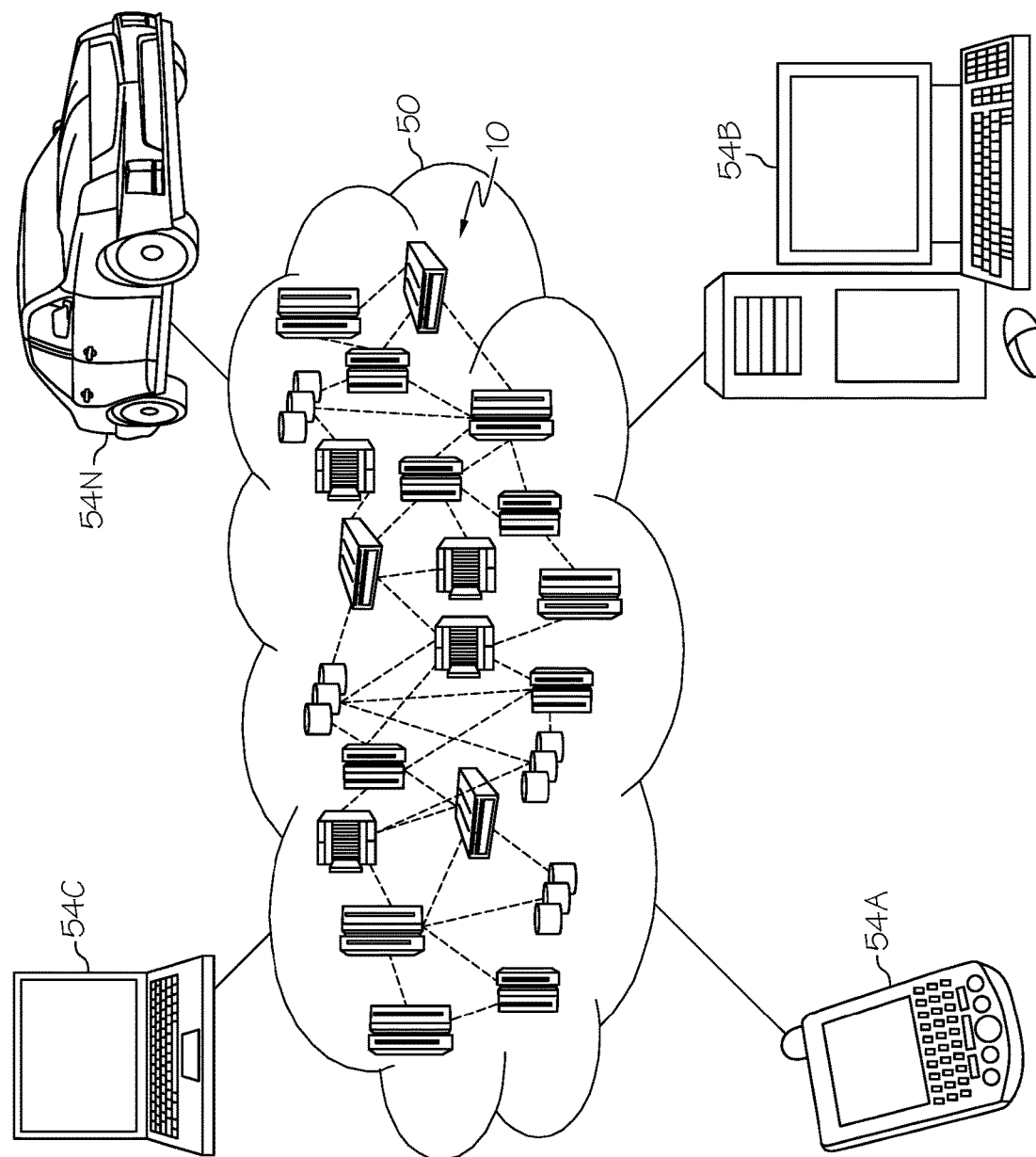
FIG. 8 depicts a cloud computing environment according to one or more embodiments of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 8 are intended to be illustrative only and that computing nodes 10 and cloud computing environment 50 can communicate with any type of computerized device over any type of network and/or network addressable connection (e.g., using a web browser).

Figure 9:
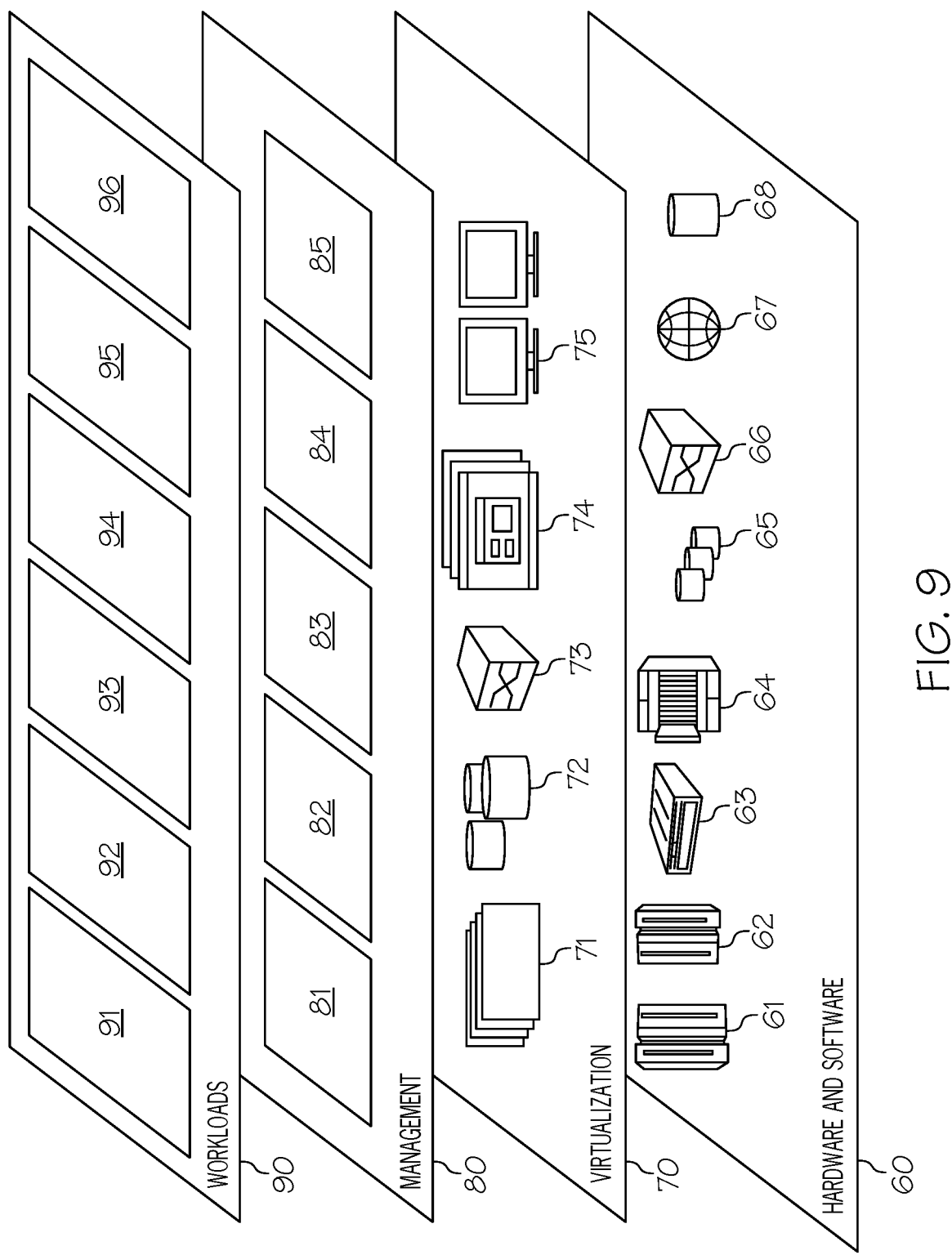
FIG. 9 depicts abstraction model layers of a cloud computer environment according to one or more embodiments of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and activity protocol management processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
directing an artificial intelligence system to compare a video of an activity by a living entity to an activity protocol that has been established for the living entity, wherein the living entity is wildlife;
receiving an indication from the artificial intelligence system that the activity by the living entity does not match the activity protocol that has been established for the living entity;
in response to receiving the indication from the artificial intelligence system that the activity by the living entity does not match the activity protocol that has been established for the living entity, directing a monitoring entity to implement the activity protocol that has been established for the living entity;
retrieving an activity calendar for the wildlife;
correlating the video of the activity by the living entity with an entry on the activity calendar for the wildlife; and
identifying the wildlife based on a correlation of the video of the activity by the living entity with the entry on the activity calendar for the wildlife.

2. The method of claim 1, further comprising:
activating an activity enabling device in order to implement the activity protocol that has been established for the living entity, wherein the activity enabling device is a physical device that, when activated, enables the activity protocol to be implemented.

3. The method of claim 1, wherein the artificial intelligence system is a convolutional neural network (CNN), and wherein the method further comprises:
directing the CNN to extract an image of the living entity from an image of an environment of the living entity; and
directing the CNN to use the extracted image of the living entity when comparing the video of the activity by the living entity to the activity protocol that has been established for the living entity.

4. The method of claim 1, wherein the artificial intelligence system is a convolutional neural network (CNN), wherein the video is a stack of video images taken at predetermined intervals that are greater than an image capture rate of a video camera, and wherein the method further comprises:
directing that the stack of video images be utilized as inputs to the CNN in order to identify the activity by the living entity.

5. The method of claim 1, wherein the video is part of a plurality of videos of activities by the living entity, wherein each of the plurality of videos are taken on different dates, and wherein the method further comprises:
transmitting the plurality of videos to the monitoring entity, wherein each of the plurality of videos is transmitted to the monitoring entity on the different dates;
receiving, from the monitoring entity, responses to the plurality of videos that were transmitted to the monitoring entity on the different dates;
utilized received responses to the plurality of videos to determine a relevance of each of the videos to the activity protocol; and
directing the artificial intelligence system to utilize videos having a relevance level that is greater than a predefined value as inputs for determining that the activity by the living entity does not match the activity protocol that has been established for the living entity.

6. The method of claim 1, wherein the living entity is wildlife, and wherein the activity protocol is a pattern of feeding by the wildlife.

7. The method of claim 1, wherein the living entity is wildlife, and wherein the activity protocol is a pattern of travel by the wildlife.

8. The method of claim 1, wherein the living entity is a domesticated animal, and wherein the activity protocol is a pattern of feeding by the domesticated animal.

9. A computer program product comprising one or more computer readable storage media having one or more program instructions collectively stored on the one or more computer readable storage media, wherein the one or more computer readable storage media are not transitory signals per se, and wherein the one or more program instructions are readable and executable by a processor to cause the processor to perform a method comprising:
directing an artificial intelligence system to compare a video of an activity by a living entity to an activity protocol that has been established for the living entity, wherein the living entity is wildlife;
retrieving an activity calendar for the wildlife;
correlating the video of the activity by the living entity with an entry on the activity calendar for the wildlife; and
identifying the wildlife based on a correlation of the video of the activity by the living entity with the entry on the activity calendar for the wildlife.

10. The computer program product of claim 9, wherein the method further comprises:
activating an activity enabling device in order to implement the activity protocol that has been established for the living entity, wherein the activity enabling device is a physical device that, when activated, enables the activity protocol to be implemented.

11. The computer program product of claim 9, wherein the artificial intelligence system is a convolutional neural network (CNN), and wherein the method further comprises:
directing the CNN to extract an image of the living entity from an image of an environment of the living entity; and
directing the CNN to use the extracted image of the living entity when comparing the video of the activity by the living entity to the activity protocol that has been established for the living entity.

12. The computer program product of claim 9, wherein the artificial intelligence system is a convolutional neural network (CNN), wherein the video is a stack of video images taken at predetermined intervals that are greater than an image capture rate of a video camera, and wherein the method further comprises:
directing that the stack of video images be utilized as inputs to the CNN in order to identify the activity by the living entity.

13. The computer program product of claim 9, wherein the video is part of a plurality of videos of activities by the living entity, wherein each of the plurality of videos are taken on different dates, and wherein the method further comprises:
- transmitting the plurality of videos to the monitoring entity, wherein each of the plurality of videos is transmitted to the monitoring entity on the different dates;
- receiving, from the monitoring entity, responses to the plurality of videos that were transmitted to the monitoring entity on the different dates;
- utilized received responses to the plurality of videos to determine a relevance of each of the videos to the activity protocol; and
- directing the artificial intelligence system to utilize videos having a relevance level that is greater than a predefined value as inputs for determining that the activity by the living entity does not match the activity protocol that has been established for the living entity.

14. The computer program product of claim 9, wherein the one or more program instructions are provided as a service in a cloud environment.

15. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
- directing an artificial intelligence system to compare a video of an activity by a living entity to an activity protocol that has been established for the living entity, wherein the living entity is wildlife;
- retrieving an activity calendar for the wildlife;
- correlating the video of the activity by the living entity with an entry on the activity calendar for the wildlife; and
- identifying the wildlife based on a correlation of the video of the activity by the living entity with the entry on the activity calendar for the wildlife.

16. The computer system of claim 15, wherein the wildlife is a microorganism, and wherein the method further comprises:
- detecting, from the video, that a concentration of the microorganism in the water sample exceeds a predetermined maximum concentration; and
- in response to detecting that the concentration of the microorganism in the water sample exceeds the predetermined maximum concentration, adding water to the water source until a concentration of microorganisms in the water source is below the predetermined maximum concentration.

17. The computer system of claim 15, wherein the wildlife is a microorganism, and wherein the method further comprises:
- detecting, from the video, that a concentration of the microorganism in the water sample exceeds a predetermined maximum concentration; and
- in response to detecting that the concentration of the microorganism in the water sample exceeds the predetermined maximum concentration, adding an anti-microorganism solution to the water source until a concentration of microorganisms in the water source is below the predetermined maximum concentration.

18. The computer system of claim 16, wherein the video is part of a plurality of videos of activities by the living entity, wherein each of the plurality of videos are taken on different dates, and wherein the method further comprises:
- transmitting the plurality of videos to the monitoring entity, wherein each of the plurality of videos is transmitted to the monitoring entity on the different dates;
- receiving, from the monitoring entity, responses to the plurality of videos that were transmitted to the monitoring entity on the different dates;
- utilized received responses to the plurality of videos to determine a relevance of each of the videos to the activity protocol; and
- directing the artificial intelligence system to utilize videos having a relevance level that is greater than a predefined value as inputs for determining that the activity by the living entity does not match the activity protocol that has been established for the living entity.

19. The computer system of claim 16, wherein the stored program instructions are provided as a service in a cloud environment.

* * * * *